US012568457B2

(12) United States Patent
Wiacek et al.

(10) Patent No.: US 12,568,457 B2
(45) Date of Patent: Mar. 3, 2026

(54) TIME OF ARRIVAL METHOD FOR UE POSITIONING IN DISTRIBUTED RAN SYSTEM ARCHITECTURE

(71) Applicant: Nokia Technologies Oy, Espoo (FI)

(72) Inventors: Fabian Wiacek, Warsaw (PL); Maciej Januszewski, Pila (PL)

(73) Assignee: Nokia Technologies Oy, Espoo (FI)

( * ) Notice: Subject to any disclaimer, the term of this patent is extended or adjusted under 35 U.S.C. 154(b) by 321 days.

(21) Appl. No.: 18/226,335

(22) Filed: Jul. 26, 2023

(65) Prior Publication Data

US 2024/0040526 A1 Feb. 1, 2024

(30) Foreign Application Priority Data

Jul. 26, 2022 (FI) ..................................... 20225690

(51) Int. Cl.
H04W 56/00 (2009.01)
H04J 3/06 (2006.01)

(52) U.S. Cl.
CPC ....... H04W 56/0045 (2013.01); H04J 3/0661 (2013.01)

(58) Field of Classification Search
CPC ..... H04W 64/00; H04W 64/006; H04W 4/02; H04W 4/025; H04W 4/027; H04W 56/001; H04W 56/004; H04W 56/0045; H04W 56/005; H04W 56/0065; H04J 3/0658; H04J 3/0661; H04J 3/0682; G01S 5/021; G01S 5/0268
See application file for complete search history.

(56) References Cited

U.S. PATENT DOCUMENTS

| | | | | |
|---|---|---|---|---|
| 8,825,076 | B2 * | 9/2014 | Qin ........................... | G01S 5/12 |
| | | | | 455/456.1 |
| 12,335,890 | B2 * | 6/2025 | Min ...................... | H04W 56/00 |
| 2020/0100130 | A1 | 3/2020 | Bahnasy et al. | |
| 2022/0015051 | A1 | 1/2022 | Duan et al. ......................... | 56/4 |
| 2022/0053422 | A1 | 2/2022 | Choi et al. ...................... | 52/229 |
| 2022/0086822 | A1 | 3/2022 | Bao et al. ......................... | 72/48 |
| 2024/0179758 | A1 * | 5/2024 | Cui ................... | H04W 74/0838 |

FOREIGN PATENT DOCUMENTS

WO        WO 2021/080478 A1        4/2021

OTHER PUBLICATIONS

Moderator (Huawei), "Feature lead summary#1 on propagation delay compensation enhancements," 3GPP TSG RAN WG1 Meeting #106bis-e, R1-2110473, Oct. 11-19, 2021.
O-RAN FrontHaul Working Group, "Control, User and Synchronization Plane Specification," O-RAN.WG4.CUS.0-v06.00, Sep. 24, 2021.

* cited by examiner

*Primary Examiner* — Peter Chen
(74) *Attorney, Agent, or Firm* — Barta Jones, PLLC

(57) ABSTRACT

Example embodiments provide a method to determine a reference signal transmission delay by a base station for a distributed RAN or cloud system architecture. The method uses an over the air transmission time and compensates for a possible reference clock discrepancy. Further, a method for TOA-based propagation delay measurement is provided, where consecutive reference signal transmission delays have a variable pattern or high precision is needed. Apparatuses, methods, and computer programs are disclosed.

3 Claims, 6 Drawing Sheets

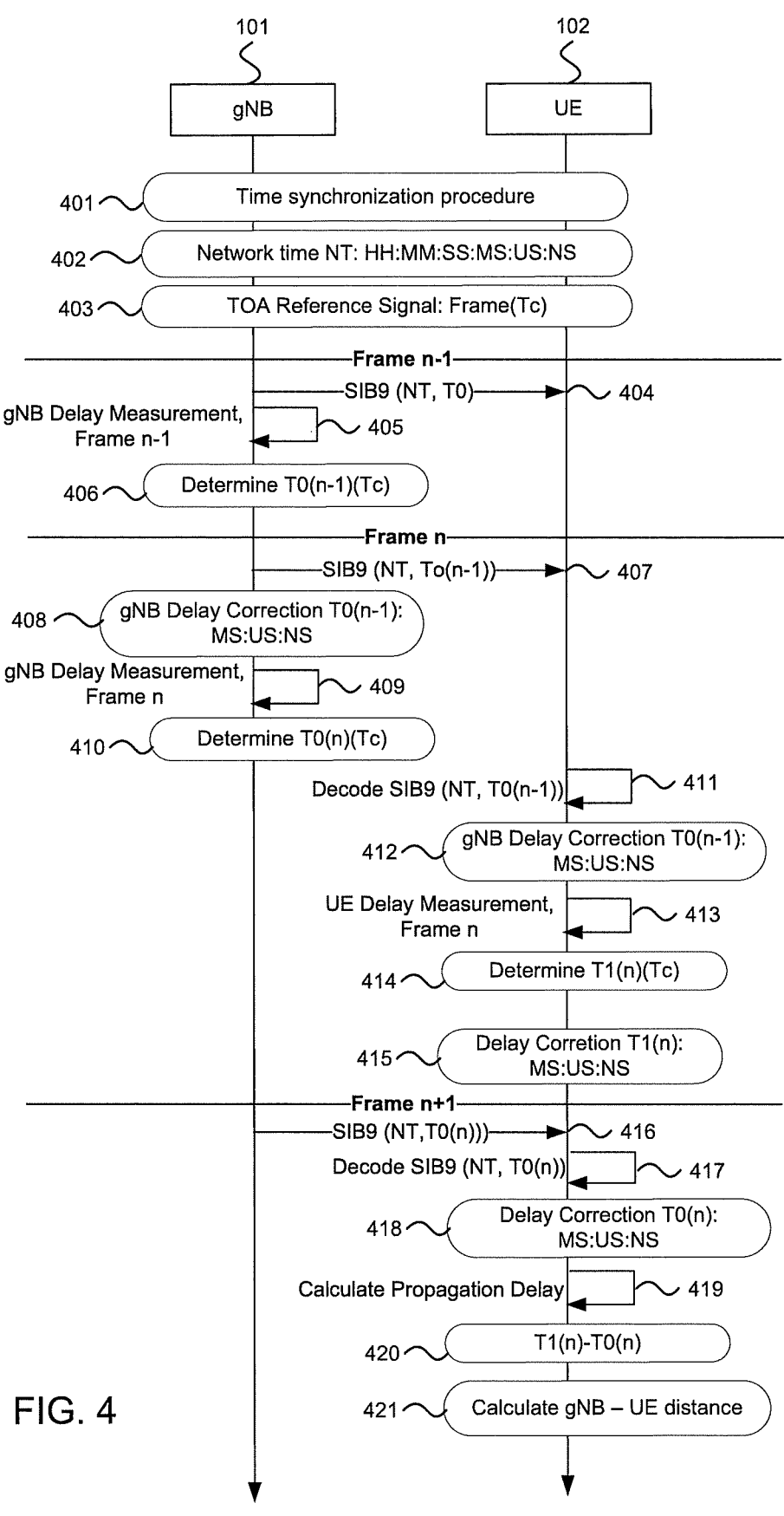

101     102 gNB        UE

401 — Time synchronization procedure

402 — Network time NT: HH:MM:SS:MS:US:NS

403 — TOA Reference Signal: Frame(Tc)

Frame n-1

SIB9 (NT, T0) — 404 gNB Delay Measurement, Frame n-1 — 405

406 — Determine T0(n-1)(Tc)

Frame n

SIB9 (NT, To(n-1)) — 407

408 — gNB Delay Correction T0(n-1): MS:US:NS gNB Delay Measurement, Frame n — 409

410 — Determine T0(n)(Tc)

Decode SIB9 (NT, T0(n-1)) — 411

412 — gNB Delay Correction T0(n-1): MS:US:NS

UE Delay Measurement, Frame n — 413

414 — Determine T1(n)(Tc)

415 — Delay Corretion T1(n): MS:US:NS

Frame n+1

SIB9 (NT,T0(n))) — 416

Decode SIB9 (NT, T0(n)) — 417

418 — Delay Correction T0(n): MS:US:NS

Calculate Propagation Delay — 419

420 — T1(n)-T0(n)

421 — Calculate gNB – UE distance

501 — Receive base station reference signal transmission delay (TOA T0) from a given cell broadcast 502 — Monitor TOA T0 stability from the same cell 503 — Use consecutive reference signals if TOA T0 is stable and the same reference signal if TOA T0 is variable for TOA propagation delay measurement 504 — Determine TOA propagation delay

TIME OF ARRIVAL METHOD FOR UE POSITIONING IN DISTRIBUTED RAN SYSTEM ARCHITECTURE

TECHNICAL FIELD

The present application generally relates to information technology. In particular, some example embodiments of the present application relate to improved propagation delay compensation in distributed RAN/cloud system architectures.

BACKGROUND

Time of arrival (TOA) calculations are of general interest to improve propagation delay compensation for future applications that need exact positioning.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Example embodiments may enable improved propagation delay and time of arrival calculations that can be used in all kinds of applications, from improving a user node-base station link inside the cell to improved positioning applications. This may be achieved by the features of the independent claims. Further implementation forms are provided in the dependent claims, the description, and the drawings.

According to a first aspect, an apparatus may comprise at least one processor; and at least one memory including computer program code; the at least one memory and the computer code configured to, with the at least one processor, cause the apparatus at least to determine a reference signal transmission time at a base station antenna connector with a reference clock at a radio unit of the base station as a reference, wherein the reference signal transmission time is specified by an over the air transmission time for a reference symbol related to a last packet received by the radio unit from a distributed unit of the base station measured with a reference clock at the distributed unit as the reference; determine a timestamp of the reference clock at the distributed unit encoded in the last received packet data; determine a delay between the reference clocks at the distributed unit and the radio unit; determine a reference signal transmission delay correction at the base station by subtracting the timestamp value from the reference signal transmission time and by subtracting or adding the delay between the reference clocks; and compensate for delays at the base station based on the reference signal transmission delay correction.

According to an example embodiment of the first aspect, the at least one memory and the computer code are further configured to, with the at least one processor, cause the apparatus to transmit the reference signal transmission delay correction to a user node in a cell broadcast.

According to an example embodiment of the first aspect, the at least one memory and the computer code are further configured to, with the at least one processor, cause the apparatus to provide the reference signal transmission delay correction to a localization server.

According to an example embodiment of the first aspect, the reference signal transmission delay correction is provided to the user node as SIB9 time encoded in the data packet.

According to an example embodiment of the first aspect, the reference clocks of the distributed unit and the radio unit are the same reference clock.

According to an example embodiment of the first aspect, the reference clock of the radio unit is synchronized by the reference clock of the distributed unit.

According to an example embodiment of the first aspect, the measurements are performed based on an absolute reference time or based on a system frame number based time.

According to a second aspect, an apparatus may comprise at least one processor; and at least one memory including computer program code; the at least one memory and the computer code configured to, with the at least one processor, cause the apparatus at least to receive a reference signal transmission delay correction from a base station, wherein the reference signal transmission delay is specified for a last received packet for a given reference symbol; determine a reference signal reception delay at a user node for the same reference signal; determine a time of arrival propagation delay by subtracting the reference signal transmission delay correction from the reference signal reception delay of the same reference signal; and initiate at least one application utilizing the time of arrival propagation delay.

According to an example embodiment of the second aspect, the reference signal transmission delay correction is received by the user node in a cell broadcast from the base station.

According to an example embodiment of the second aspect, the propagation delay measurement is triggered by a reception of a reference signal transmission delay correction for a previous reference signal.

According to an example embodiment of the second aspect, the at least one memory and the computer code are further configured to, with the at least one processor, cause the apparatus to monitor stability of the reference signal transmission delay corrections by comparing consecutive reference signal transmission delay values received from the same cell by the user node; and determine the time of arrival propagation delay based on consecutive reference signals by subtracting the reference signal transmission delay correction of a previous reference signal from the reference signal reception delay of the last received reference signal when the reference signal transmission delay values are stabile and by using the same reference signals when the network node reference signal transmission delay values are variable.

According to an example embodiment of the second aspect, the at least one memory and the computer code are configured to, with the at least one processor, cause the apparatus to determine the time of arrival propagation delay based on the same reference signals when a high accuracy propagation delay measurement is required.

According to an example embodiment of the second aspect, the at least one application comprises at least one of positioning, radio resource control, RRC, connection establishment, filtering, time synchronization, network time monitoring, support for extended connection or improving time advance accuracy.

According to an example embodiment of the second aspect, the measurements are performed based on an absolute reference time or based on a system frame number based time.

According to a third aspect, a method may comprise determining a reference signal transmission time at a base station antenna connector with a reference clock at a radio unit of the base station as a reference, wherein the reference signal transmission time is specified by an over the air transmission time for a reference symbol related to a last packet received by the radio unit from a distributed unit of the base station measured with a reference clock at the distributed unit as the reference; determining a timestamp of the reference clock at the distributed unit encoded in the last received packet data; determining a delay between the reference clocks at the distributed unit and the radio unit; determining a reference signal transmission delay correction at the base station by subtracting the timestamp value from the reference signal transmission time and by subtracting or adding the delay between the reference clocks; and compensating for delays at the base station based on the reference signal transmission delay correction.

According to an example embodiment of the third aspect, the at least one memory and the computer code are further configured to, with the at least one processor, cause the apparatus to transmit the reference signal transmission delay correction to a user node in a cell broadcast.

According to an example embodiment of the third aspect, the at least one memory and the computer code are further configured to, with the at least one processor, cause the apparatus to provide the reference signal transmission delay correction to a localization server.

According to an example embodiment of the third aspect, the reference signal transmission delay correction is provided to the user node as SIB9 time encoded in the data packet.

According to an example embodiment of the third aspect, the reference clocks of the distributed unit and the radio unit are the same reference clock.

According to an example embodiment of the third aspect, the reference clock of the radio unit is synchronized by the reference clock of the distributed unit.

According to an example embodiment of the third aspect, the measurements are performed based on an absolute reference time or based on a system frame number based time.

According to a fourth aspect, a method may comprise receiving a reference signal transmission delay correction from a base station, wherein the reference signal transmission delay is specified for a last received packet for a given reference symbol; determining a reference signal reception delay at a user node for the same reference signal; and determining a time of arrival propagation delay by subtracting the reference signal transmission delay correction from the reference signal reception delay of the same reference signal.

According to an example embodiment of the fourth aspect, the reference signal transmission delay correction is received by the user node in a cell broadcast from the base station.

According to an example embodiment of the fourth aspect, the propagation delay measurement is triggered by a reception of a reference signal transmission delay correction for a previous reference signal.

According to an example embodiment of the fourth aspect, the method may comprise monitoring stability of the reference signal transmission delay corrections by comparing consecutive reference signal transmission delay values received from the same cell by the user node; and determining the time of arrival propagation delay based on consecutive reference signals by subtracting the reference signal transmission delay correction of a previous reference signal from the reference signal reception delay of the last received reference signal when the reference signal transmission delay values are stabile and by using the same reference signals when the network node reference signal transmission delay values are variable.

According to an example embodiment of the fourth aspect, the method may comprise determining the time of arrival propagation delay based on the same reference signals when a high accuracy propagation delay measurement is required.

According to an example embodiment of the fourth aspect, the at least one application comprises at least one of positioning, radio resource control, RRC, connection establishment, filtering, time synchronization, network time monitoring, support for extended connection or improving time advance accuracy.

According to an example embodiment of the fourth aspect, the measurements are performed based on an absolute reference time or based on a system frame number based time.

According to a fifth aspect, a computer program may be configured, when executed by a processor, to cause an apparatus at least to perform the following: determining a reference signal transmission time at a base station antenna connector with a reference clock at a radio unit of the base station as a reference, wherein the reference signal transmission time is specified by an over the air transmission time for a reference symbol related to a last packet received by the radio unit from a distributed unit of the base station measured with a reference clock at the distributed unit as the reference; determining a timestamp of the reference clock at the distributed unit encoded in the last received packet data; determine a delay between the reference clocks at the distributed unit and the radio unit; determining a reference signal transmission delay correction at the base station by subtracting the timestamp value from the reference signal transmission time and by subtracting or adding the delay between the reference clocks; and compensating for delays at the base station based on the reference signal transmission delay correction. The computer program may further comprise instructions for causing the apparatus to perform any example embodiment of the method of the third aspect.

According to a sixth aspect, an apparatus may comprise means for determining a reference signal transmission time at a base station antenna connector with a reference clock at a radio unit of the base station as a reference, wherein the reference signal transmission time is specified by an over the air transmission time for a reference symbol related to a last packet received by the radio unit from a distributed unit of the base station measured with a reference clock at the distributed unit as the reference; determining a timestamp of the reference clock at the distributed unit encoded in the last received packet data; determine a delay between the reference clocks at the distributed unit and the radio unit; determining a reference signal transmission delay correction at the base station by subtracting the timestamp value from the reference signal transmission time and by subtracting or adding the delay between the reference clocks; and compensating for delays at the base station based on the reference signal transmission delay correction. The apparatus may further comprise means for performing any example embodiment of the method of the third aspect.

According to a seventh aspect, a computer program may comprise instructions for causing an apparatus to perform at least the following: receiving a reference signal transmission delay correction from a base station, wherein the reference signal transmission delay is specified for a last received packet for a given reference symbol; determining a reference signal reception delay at a user node for the same reference signal; and determining a time of arrival propagation delay by subtracting the reference signal transmission delay correction from the reference signal reception delay of the same reference signal. The computer program may further comprise instructions for causing the apparatus to perform any example embodiment of the method of the fourth aspect.

According to an eighth aspect, an apparatus may comprise means for receiving a reference signal transmission delay correction from a base station, wherein the reference signal transmission delay is specified for a last received packet for a given reference symbol; determining a reference signal reception delay at a user node for the same reference signal; and determining a time of arrival propagation delay by subtracting the reference signal transmission delay correction from the reference signal reception delay of the same reference signal. The apparatus may further comprise means for performing any example embodiment of the method of the fourth aspect.

Many of the attendant features will be more readily appreciated as they become better understood by reference to the following detailed description considered in connection with the accompanying drawings.

DESCRIPTION OF THE DRAWINGS

The accompanying drawings, which are included to provide a further understanding of the example embodiments and constitute a part of this specification, illustrate example embodiments and together with the description help to explain the example embodiments. In the drawings:

FIG. 4 illustrates an example of a message sequence chart for time of arrival propagation delay measurements for variable delays in a distributed or a cloud system architecture, according to an example embodiment;

Like references are used to designate like parts in the accompanying drawings.

DETAILED DESCRIPTION

Figure 1:
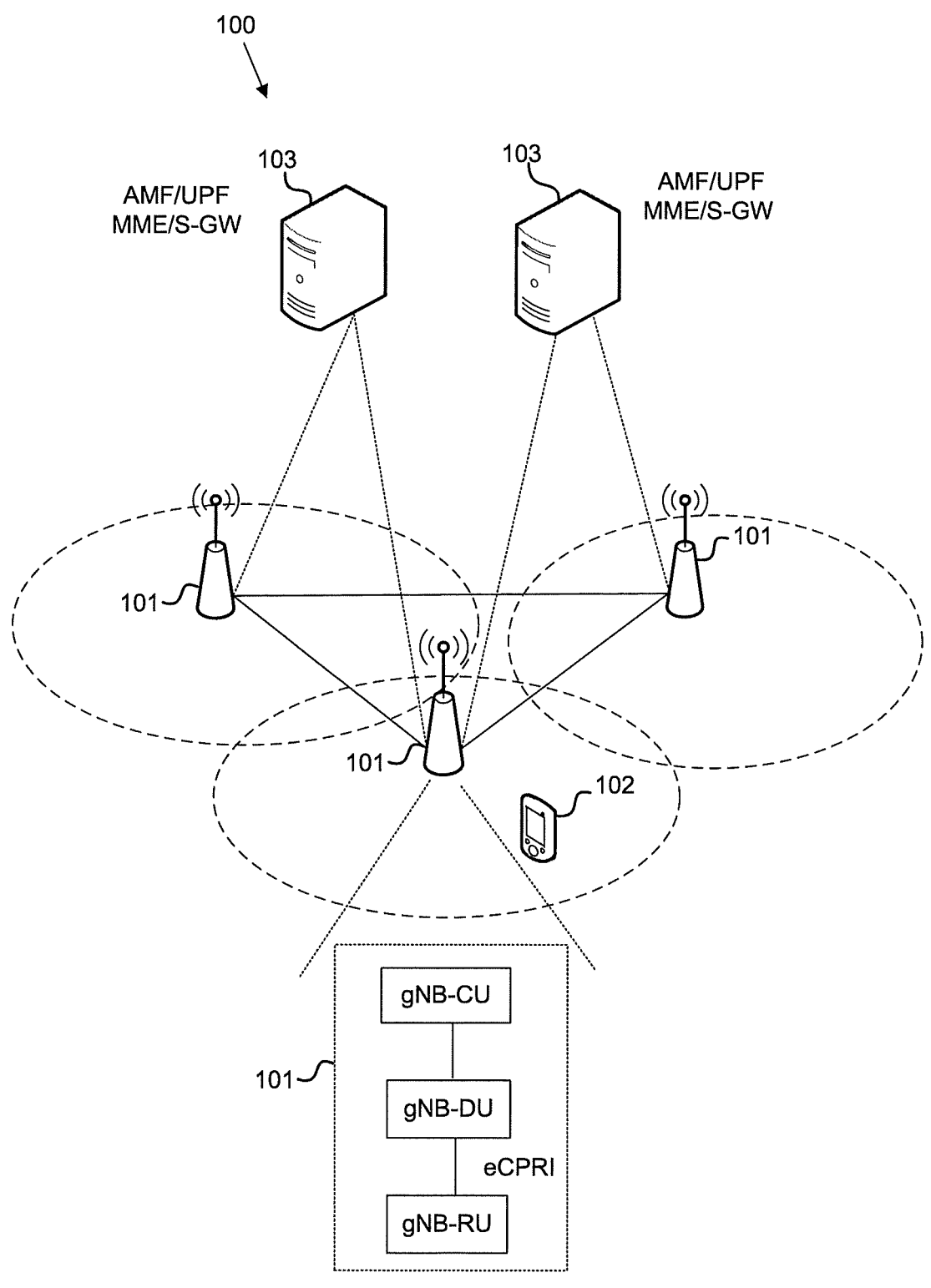
FIG. 1 illustrates an example of a communication network comprising at least one network node and a client node according to an example embodiment.

Reference will now be made in detail to example embodiments, examples of which are illustrated in the accompanying drawings. The detailed description provided below in connection with the appended drawings is intended as a description of the present examples and is not intended to represent the only forms in which the present examples may be constructed or utilized. The description sets forth the functions of the example and a possible sequence of operations for constructing and operating the example. However, the same or equivalent functions and sequences may be accomplished by different examples.

In general, TOA is one-way propagation time of a signal travelling between a source and a receiver. For example, position estimates in wireless networks may be calculated using time of arrival measurements. A time of arrival method is based on a reference signal propagation delay, which uses information about base station reference signal transmission delay, TOA T0, and user equipment reference signal reception delay, TOA T1.

For example, a UE may determine its own position based on data indicative of a geographic position of a plurality of base stations and a transmission time of a reference signal or reference data. The transmission time may be the time of transmitting the position data or the time of transmitting any other reference signal or reference data. The reference signal/data may be any agreed signal or data having a repetitive nature. It may for example be the time of the start of a particular frame or a sub-frame or any agreed symbol. The TOA measurement may be used for a distance calculation between the source and the receiver based on a propagation delay between the transmission time and the reception time of the data, wherein the computed TOA is multiplied by a known propagation speed.

Potential enhancements for propagation delay compensation comprise timing advance (TA) based propagation delay compensation, round-trip time (RTT) based delay compensation and gNB-side pre-compensation. One solution is to use the TOA T0 for the gNB-side pre-compensation.

A downlink frame timing accuracy should be approximately 100 ns. A delay budget may be measured and assessed at the base station. A measured delay error may be then signaled by TOA T0 to improve overall propagation delay accuracy far below the desired 100 ns, i.e., to a level of reference clock accuracy, which may be typically within 2-5 ns. For example, a timing accuracy at an antenna collector may be measured with an accuracy of 4.22 ns RMS. Thus, this value may be signaled to a UE by the TOA T0, and hence, a higher precision of propagation delay measurement may be provided. The TOA method may use cell broadcast for TOA T0 signaling. Thus, TOA may be considered as a downlink-related method, where only downlink delays may be measured and covered by TOA T0.

The TOA concept was initially proposed for a centralized PAN (radio access network) architecture, which is a typical application for LTE. However, in case of 5G and newer LTE architectures, a distributed or a cloud PAN system architecture may be more frequently utilized.

A distributed PAN or a cloud system architecture differs from a centralized PAN system architecture due to an additional Ethernet connection between a downlink/distributed unit (DU) and a radio unit (RU) provided by an enhanced common public radio interface, eCPRI. This difference may have an impact on overall delay budget management, which may be essential for correct application of the TOA concept.

When a distributed PAN/cloud system architecture utilizes an eCPRI protocol, it has an impact on internal timing and synchronization issues, which may then impact the propagation delay measurements, if not handled properly. In the ethernet transport network, measured delays may not be constant, for example, due to switching delays such as packet delay variation (PDV).

In distributed PAN/cloud system architectures, one of the key reference time-markers may be denoted as over the air transmission time (Ra), which specifies a time at which the given symbol shall be transmitted with a precision as specified in the air interface standards. Hence, the processing, transmission and buffering budget should be configured with Ra as a reference.

Reference points for the eCPRI may be specified by latency requirements. The reference points may comprise a transmit/receive interface at the DU, a receive/transmit interface at the RU and an antenna interface (Ra) at the RU. The transmission delay encompasses only the time from when a bit leaves from sender (e.g., RU or DU) until it is received at the receiver (e.g., DU or RU). The transport delay may be considered as a range with upper and lower bounds comprising a downlink transport delay and an uplink transport delay. However, as fixed timing at Ra is required, Ra may be used as the reference point for delay management in the eCPRI model. Hence, the reception and transmission at the reference points may be measured relative to Ra. Further, all packets associated with the given signal may need to be gathered prior to transmission, which may impact the overall delay budget.

Hence, the distributed RAN/cloud system architecture differs from the centralized architecture in the base station transmission delay assessment. In the distributed RAN/cloud system architecture, the usage of an asynchronous eCPRI interface and possible relatively long distances between the DU and RU components requires different algorithms for the delay assessment. This in turn may impact TOA concept application in the distributed architecture.

The TOA method described herein relates to a base station and a user equipment for both LTE and 5G, as well as to products that include precise location determination. The method enables determining a more accurate propagation delay to a user node. This may enable better time of arrival calculations that can be used in all kinds of applications. The proposed method enables application of the time of arrival concept for UE positioning, time synchronization and establishing RRC connections for distributed PAN and cloud system architectures.

According to an example embodiment, a new algorithm for TOA T0 calculation by the base station may be used to solve timing related problems related to usage of over the air transmission time for delay assessment and potential discrepancy between reference clocks at the DU and the RU. More specifically, in the method a $T_{air}$ value is sent from a distributed unit to a radio unit, denoting the time when a given packet should be transmitted over the air. Further, a possible reference clock discrepancy, handled by a factor $\Delta(Ta;Tb)$, may be compensated. These factors may have an impact on an accuracy of the TOA T0 calculation, which in turn may have an impact on TOA-based propagation delay measurements.

In addition, a new method for TOA-based propagation delay measurement is provided. In the method, the same reference signal may be used for the propagation delay measurements when consecutive TOA T0 measurements have a variable and unpredictable pattern, or where a high accuracy propagation delay measurement is required.

Advantageously, TOA-related enhancements may be possible also when the UE is in the distributed RAN/cloud system architecture coverage, where TOA T0 may have a variable character. With the proposed methods, the UE may be provided with more reliable TOA T0 corrections, and the UE may improve the accuracy of TOA-based propagation delay measurements.

FIG. 1 illustrates an example of a communication network 100 comprising at least one network node and a client node according to an example embodiment.

The communication network 100 may comprise one or more core network elements 103 such as for example an access and mobility management function (AMF) and/or a user plane function (UPF) and one or more base stations, represented by gNBs 101. In an embodiment, one or more base stations may be eNBs. The communication network 100 may further comprise one or more client nodes, which may be also referred to as user nodes or UE. For example, the network may comprise a UE 102. The UE 102 may communicate with one or more of the base stations via wireless radio channel(s). Communications between the UE 102 and gNB 101 may be bidirectional. Hence, any of the devices may be configured to operate as a transmitter and/or a receiver.

The base stations 101 may be configured to communicate with the core network elements 103 over a communication interface, such as for example a control plane interface or a user plane interface NG-C/U. Base stations may be also called radio access network (RAN) nodes and they may be part of a radio access network between the core network and the UEs. Network elements AMF/UPF and gNB may be generally referred to as network nodes or network devices. Although depicted as a single device, a network node may not be a stand-alone device, but for example a distributed computing system coupled to a remote radio head.

In an embodiment, the communication system 100 may comprise a distributed RAN system architecture, wherein functions of the gNB may be divided into a distributed unit (gNB-DU), a control unit (gNB-CU or CU), and a radio unit (gNB-RU or RU). The distributed unit may be also referred to as a downlink unit (DU). The radio unit may be also referred to as a remote radio head. The RU and the DU may be connected with an eCPRI interface. In an embodiment, the DU/CU may operate in the cloud. The cloud may refer to storing and accessing data remotely over the internet.

The communication network 100 may be configured for example in accordance with the 5th Generation digital cellular communication network, as defined by the 3rd Generation Partnership Project (3GPP). In one example, the communication network 100 may operate according to 3GPP 5G-NR. It is, however, appreciated that example embodiments presented herein are not limited to this example network and may be applied in any present or future wireless or wired communication networks, or combinations thereof, for example other types of cellular networks, short-range wireless networks, broadcast or multicast networks, or the like. The distributed RAN or cloud system architecture may be considered as a typical 5G architecture.

According to an embodiment, the base station (5G/LTE) may be configured to determine TOA T0. The TOA T0 may be defined as a measurement of a downlink timing alignment error at an eNB/gNB antenna connector related to transmission of SSB, synchronization signal block, slot X in frame N used for TOA propagation delay measurement. The measurement may be performed by the eNB/gNB and the TOA T0 value may be then broadcasted to UEs in the subsequent frame.

In an embodiment, the TOA T0 may be provided to the UE 102 in cell broadcast by the base station, such as gNB 101. In an embodiment, the base station may be configured to provide the TOA T0 measurement to a network node. Instead of cell broadcasting, the TOA T0 may be directly used for TOA-based positioning supported by a localization server as an enhancement of E-CID, enhanced cell identity, positioning.

In case of a distributed RAN/cloud system architecture, to calculate the TOA T0, a new method is provided, as described later in more detail. The method is based on a relation to Ra and may include a possible time reference sources discrepancy, $\Delta(Ta;Tb)$. The TOA method may be considered as a method for propagation delay compensation, i.e., gNB-side pre-compensation. For example, the base station may be configured to internally use the measured TOA T0 values to compensate for possible delays, whereas some residual corrections may still be passed to the UE 102.

In turn, the UE 102 may be configured to calculate TOA T1 and determine a propagation delay, and then to compensate for it. The TOA T1 may be defined as a measurement of an uplink timing alignment error at a UE antenna connector related to the reception of SSB slot X in frame N used for TOA propagation delay measurement. The measurement may be performed by the UE 102 and the TOA T1 value may be used by the UE 102 to determine a true time of TOA reference signal reception.

Figure 2:
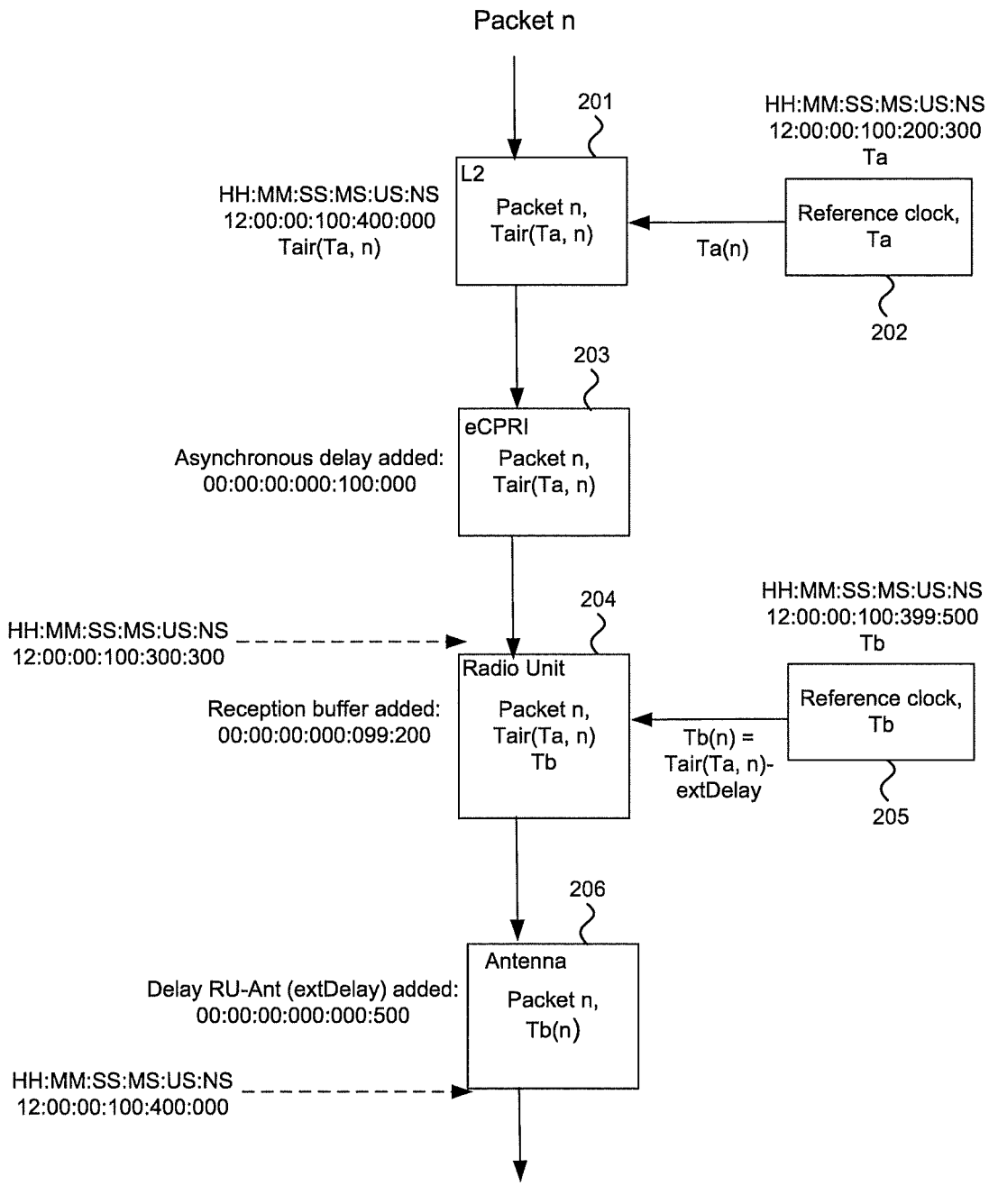
FIG. 2 illustrates an example of packet transmission delay assessment in a distributed RAN according to an example embodiment.

FIG. 2 illustrates an example of packet transmission delay assessment in a distributed PAN according to an example embodiment.

In an embodiment, a TOA-based propagation delay measurement may be done with usage of an absolute reference time, e.g., provided as SIB9 time in cell broadcast. SIB9 may comprise information related to GPS time and coordinated universal time, UTC. In an embodiment, the measurement may be done with respect to SFN-based time (system frame number, SFN).

In case of an absolute time reference, a reference time, e.g., SIB9 time (network time, NT) may be encoded in packet data form at a PDCP (packet data convergence protocol) Layer (layer 2) at DU at 201 and then such data packets may be transmitted to RU at 203.

The base station reference signal transmission delay, TOA T0, may cover all processing and transmission delays at the base station, counting from a timestamp related to a reference time encoded into a data packet, as this time value may not be further changed, until a time of reference signal physical transmission, measured at a base station antenna collector time reference point.

At DU, the time reference source may be a reference clock, Ta. Thus, the packet time value and the timestamp may depend on an accuracy of the reference clock Ta.

At RU, timing may be controlled by another reference clock, Tb. The reference clock Tb may be responsible for symbol transmission based on a specified over the air transmission time Ra value.

In an embodiment, Ta may be equal to Tb. For example, DU and RU may utilize the same reference clock or a common reference clock, e.g., GPS. Alternatively, Tb may be synchronized by Ta, e.g., by using a PTP (precision time protocol, IEEE 1588), which may be delivered directly over L2 Ethernet (ITU-T G.8275.1 or ITU-T G.8275.2).

Any possible reference time sources and time distribution architectures may be used, unless the provided time accuracy is insufficient. Nevertheless, some deviation between Ta and Tb may be expected, i.e., Δ(Ta;Tb). The deviation Δ(Ta;Tb) may be a source of an additional error in TOA T0 measurement, which may have an impact on the TOA-based propagation delay measurement.

Another time error source may be related to an external antenna delay (extDelay) parameter. An antenna connector may be used as time reference point (TRP), but antenna connector is located at antenna input. In complex antenna systems, there is additional delay related to signal transmission from antenna connector to physical signal transmission at the antenna output. Thus, extDelay may be used to compensate this additional delay. A value of the extDelay parameter may be calculated during calibration. Typically, extDelay may be included in the overall delay budget. In general, in the distributed RAN/cloud system architecture, there may be multiple different types of antennas connected with the same RU, and thus individual extDelays may need to be taken into the delay assessment.

In this context, the time of arrival method for a distributed RAN/cloud system architecture may use the Ra value for the base station delay budget assessment and to take into consideration a possible discrepancy between reference clocks (Ta, Tb) at the DU and RU side. This may be required for proper delay assessment by TOA T0 determined by the base station, which is different from the approach used for a centralized PAN.

In FIG. 2, at RU, at a time HH:MM:SS:MS:US:NS=12:00:00:100:400:000 which may refer to a Tair (Ra) time, the given reference symbol associated with packet n may be transmitted over the air interface via a radio unit antenna at 206. This time may include the extDelay delay. A trigger for transmission of this signal may be obtained from the reference clock Tb at 205.

To transmit the signal exactly at time Ra, associated data in the form of packets need to be prepared earlier. For example, at DU, at a time HH:MM:SS:MS:US:NS=12:00:00:100:200:300, reference clock Ta may initiate at 202 a process of data encoding in packets at the L2 layer at 201. The DU may use the time specified by Ra as the time reference, with an assumption that physical transmission of these packets/symbols will be aligned with indicated Tair (Ra). For clarity, Tair may be used as a synonym for Ra in this TOA concept explanation.

In the next step, at 203, associated packets n may be transmitted by the DU over an eCPRI interface to the RU, which may add an additional delay. Then, at RU at operation 304, packets n may be stored in a buffer. All packets may need to be gathered prior to given signal transmission, otherwise the signal may be rejected. Exemplary delays for eCPRI or buffering time are illustrated by FIG. 2 as an asynchronous delay 00:00:00:000:100:000 added at 203 and a reception buffer 00:00:00:000:099:200 added at 204.

In this context, Tair (Ra) may in fact determine and cover the overall delay at the base station. Packets received earlier may be just stored in a buffer, but a maximum time for packet reception may be restricted by the Ra. This may cover delays caused by PDV, packet delay variation, or high load conditions within configured limits.

It should be noted that in certain applications, such as UE positioning, a high positioning precision may be required. In this context, 1 ns may correspond to a distance around 0,3 m (reference to speed of light). Thus, any uncompensated delays may cause errors in positioning or another application, which may be undesired.

The benefit of the described TOA method is that any residual and uncompensated delay may still be reported as the TOA T0. In this context, this may include delays related to Δ(Ta;Tb), which may not be covered before the given signal transmission.

Figure 3:
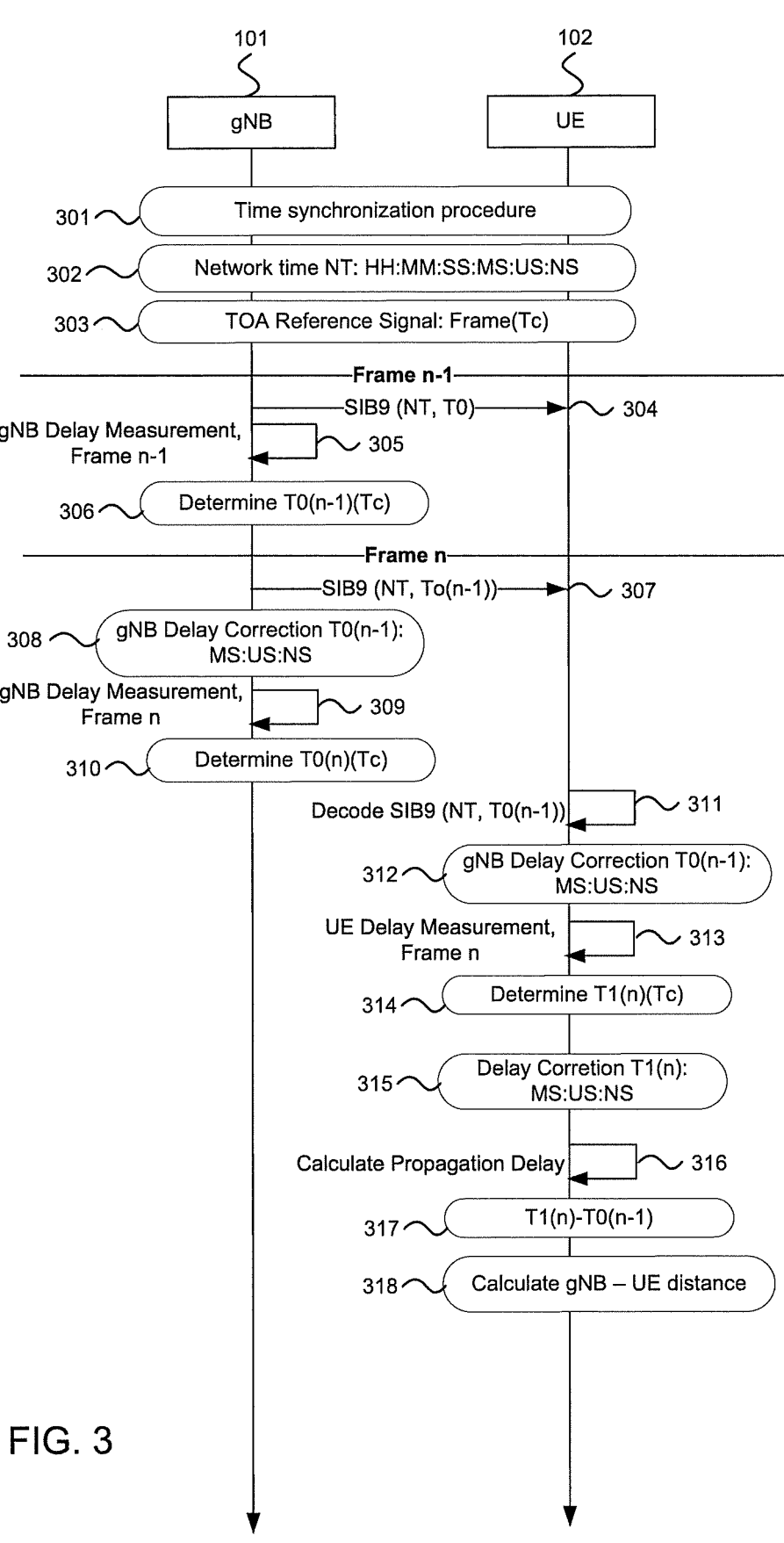
FIG. 3 illustrates an example of a message sequence chart for time of arrival propagation delay measurements for stabile delays in a centralized RAN system architecture, according to an example embodiment.

FIG. 3 illustrates an example of a message sequence chart for TOA in a centralized RAN system architecture, according to an example embodiment.

Initially, a base station, such as gNB 101, and a UE 102 may be synchronized at 301 to the same network time, 302. At 303, data to be used as a reference signal are configured at the gNB 101 and the UE 102. The reference signal may be, for example, a time of the start of a particular frame or any agreed symbol.

In an embodiment, the base station downlink timing alignment error, i.e., TOA T0, may be determined based on an n−1 reference signal. The n−1 reference signal may be, for example, a frame start, i.e., Frame(n−1). At the same time, the UE 102 may use another reference signal, i.e, Frame(n) to calculate a UE uplink timing alignment error TOA T1, which measurement may be triggered by reception of TOA T0 in Frame (n–1).

At Frame(n–1), the gNB 101 may be configured to send at 304 the given reference signal to the UE 102. After this reference signal transmission, the gNB 101 may be configured to calculate TOA T0(n–1) at 305 based on a delay measurement performed at 306.

Then, at Frame(n), the gNB 101 may send a TOA T0 correction for reference signal Frame(n–1) to the UE 102 at 307. At 308, the gNB 101 may be configured to compensate for the determined delay T0(n–1). Thereafter, at 310, the gNB 101 may be configured to determine TOA T0(n) for Frame(n) based on a delay measurement performed at 309.

The UE 102 may be configured to decode the packet data at 311 to obtain the gNB delay correction TOA T0(n–1) for the previous Frame(n–1), at 312. At 313 and 314, the UE 102 may be configured to perform a UE delay measurement and determine a reference signal reception time TOA T1 (n). Based on the TOA T1 (n), the UE 102 may perform a delay correction at 315. Thereafter, at 316 and 317, the UE 102 may be configured to determine a propagation delay Tprop=T1(n)–T0(n–1). Based on the propagation delay, the UE 102 may be configured to determine a distance between the gNB 101 and the UE 102, at 318.

Thus, transmission of two reference signals may be required for proper Tprop measurement. However, reception of only one reference signal by the UE 102 may be required to calculate the Tprop, as the UE 102 may start Tprop measurement at Frame (n).

In an embodiment, the reception of a TOA T0 correction may also trigger a TOA propagation delay measurement, and thus the operations denoted for Frame(n–1) may be considered as a trigger or precondition.

In case the measured TOA T0 corrections are stabile in consecutive measurements, the UE 102 may speed up the TOA based propagation delay measurement procedure by using data from the consecutive reference signals, e.g., at Frame(n–1) and Frame (n).

With an assumption that delays are stabile, as typically is in a centralized PAN system architecture, the propagation delay may be calculated by an equation 1:

$$T_{prop}=T_1(n)-T_0(n-1),$$

where:

$T_1(n)$ refers to reference signal reception time at the UE compensated by a TOA T1 uplink timing alignment error at the UE based on measurements at Frame (n);

To (n–1) refers to a time of reference signal transmission compensated by a TOA T0 downlink timing alignment error at the base station based on measurement at Frame(n–1); and $T_{prop}$ refers to a propagation delay.

For example, if the reported TOA T0 values have a normal distribution, or even a better accuracy, the UE 102 may be configured to use the algorithm as proposed in FIG. 3 and equation 1, as TOA T0 differences between two consecutive samples, e.g. at the Frame(n–1) and Frame(n), may be negligible. Typically, this option may be applicable for a centralized RAN system architecture due to more predictable delay factors.

Both TOA T0 and TOA T1 may represent errors referred to as an absolute time, or time associated with an SFN-time concept, for example.

In case an absolute time is used for TOA error calculation, a time reference point may be set to a PDCP/L2 layer (time when the given data are converted to data packet form). In this case, a typical TOA T0 value may be around 1 microsecond and a typical TOA T1 value may be around 1,5 microseconds, as these times refer to typical processing and transmission delays at a base station and UE respectively, as specified in 3GPP TS 136.912 for a centralized PAN system architecture.

In case SFN time is used for TOA error calculation, a time reference point may be set to an antenna connector (time when a corresponding OFDM signal is transmitted or received). In this case, TOA T0 and TOA T1 may have values expressed in nanoseconds, which depends on the SFN-time accuracy.

The UE 102 may be configured to use the determined TOA propagation delay to compensate a received network time (NT) or to calculate a UE position.

In a centralized PAN, the above equation 1 may be efficient as all base station components are relatively close each other. Thus, the signal propagation delay inside the base station may be considered to be static. Some variable delay may be related to a processing delay, especially in case of a high load.

FIG. 4 illustrates an example of a message sequence chart for time of arrival propagation delay measurements for variable delays in a distributed or a cloud system architecture, according to an example embodiment. Advantageously, in a distributed RAN/cloud system architecture, the over the air transmission time Ra may be used as a reference for TOA T0 calculation.

For simplicity, and to illustrate dependency on the last received packet associated with the given symbol, a parameter Tair may be used instead of Ra, and Tair(Ta, n) may refer to Ra time for a given symbol, carried by a packet n (the last received packet), and determined by a reference clock Ta, as illustrated in FIG. 2. However, the reference clock Tb may be responsible for execution of the transmission at the time Ra. Thus, there may be a difference between the time provided in packet data (received by UE 102), and the time of a physical signal transmission, which may be biased by Δ(Ta;Tb). Additionally, to meet deadlines specified by the Ra, DU/RU may speed up processing. This may be reflected by timestamps, which may be also used for the TOA T0 measurements.

Therefore, TOA T0 may be linked with Tair(Ta, n) (Ra) by a following equation 2:

$$T_0(n)Dist=T_b(n,T_{air}(T_a,n))-T_a(n)\pm\Delta(T_a;T_b)$$

where:

$T_{air}$ ($T_a$, n) refers to time over the air transmission Ra specified for the reference symbol related to the last received packet n, and measured with reference clock $T_a$ at DU as a reference;

Tb((n, $T_{air}(T_a$, n)) refers to the same reference signal transmission at a time specified by Ra, with reference clock Tb at RU as a reference;

$T_a$((n) refers to a timestamp for a Ta time value, carried by packet n data, e.g., SIB9 time;

$\Delta(T_a;T_b)$ refers to possible delta in time reference sources; and $T_0$(n)Dist refers to a TOA T0 correction at the base station for a distributed RAN/Cloud system architecture specified for the last received packet n for the given reference symbol.

In a distributed RAN/cloud system architecture, the DU and RU may be located at a long distance, even more than 20-30 km. This creates a challenge related to proper synchronization between components, especially in the context of the required precision for Ra.

In general, a differential GPS or an atomic clock may be considered as the best reference clock source, with an accuracy around 2-5 ns. However, for a distributed RAN/cloud system architecture, an open radio access network, o-RAN, rather proposes to use a precise time protocol (PTP) (IEEE 1588), which may be delivered directly over L2 Ethernet (ITU-T G.8275.1 or ITU-T G.8275.2) for reference clock distribution.

In this context, the TOA method for a distributed RAN/cloud system architecture may use any available time reference source or reference clock distribution system with an assumption that a quality of the reference clock system used at DU and RU may be monitored and any discrepancy may be assessed by the factor $\Delta(Ta;Tb)$. Then, if a discrepancy in the reference time source is detected between the DU and the RU, it may be compensated by correction $\Delta(Ta;Tb)$ provided in the equation 2.

In the distributed RAN/cloud system architecture, the reference clock at the DU may be used for timestamping, or as a time source for SIB9 time encoded in a data packet, whereas at the RU, the reference clock may be responsible for signal transmission at an agreed time, Ra. Thus, a possible discrepancy between the reference clocks may have an impact on a TOA propagation delay accuracy, especially if an absolute time is used as a reference.

Thus, by including the factor $\Delta(Ta;Tb)$ in equation 2, it may be possible to compensate for this potential source of error and improve the propagation delay measurement accuracy. In a centralized RAN, the same reference clock may be responsible for both actions, and thus, the time error may be negligible.

Additionally, assuming high variation of consecutive TOA T0 values, usage of the same reference signal may be needed to reduce the error budget. In this context, the equation 2 may be modified into following equations 3 and 4, and a new algorithm for a distributed RAN/cloud system architecture may be used, as illustrated in FIG. 4.

Therefore, $T_0(n)Dist$ may be used instead of $T_0(n-1)$ in the equation 1, and propagation delay Tprop for the distributed RAN/cloud system architecture may be measured using one of the following equations:

$$T_{prop}(n)Dist = T_1(n) - T_0(n)Dist \qquad \text{(equation 3), or}$$

$$T_{prop}(n)Dist = T_1(n) - T_b(n, T_{air}(T_a, n)) - T_a(n) \pm \Delta(T_a; T_b) \qquad \text{(equation 4),}$$

where:

$T_1(n)$ refers to the TOA T1 measurement at a UE; and
$T_{prop}(n)Dist$ refers to the propagation delay measurement in a distributed RAN/Cloud system architecture.

Initially, a base station, such as gNB 101, and a UE 102 may be synchronized at 401 to the same network time, 402. At 403, data to be used as a reference signal are configured at the gNB 101 and the UE 102. The reference signal may be, for example, a time of the start of a particular frame or any agreed symbol.

At Frame(n-1) at 404, the gNB 101 may be configured to send the given reference signal. After the reference signal transmission, the gNB 101 may calculate TOA T0(n-1) at 405 and 406, similarly as in FIG. 3. Next, at 407, the UE 102 may be configured to receive a TOA T0(n-1) correction. At 408, the gNB 101 may be configured to compensate for the determined delay.

At 411, the UE 102 may be configured to decode the packet received at 407. Based on the contained TOA T0 correction for Frame(n-1), the UE 102 may be configured to compensate for the delay at 412. In this case, due to the distributed RAN/cloud architecture, TOA T0 variability may be expected. However, the UE 102 may be configured to initiate TOA T1 measurements for the reference signal Frame(n) at 413 and 414 to compensate for the UE delay at 415. Consequently, the gNB 101 may be configured to calculate a TOA T0 correction for the reference signal Frame (n), TOA T0(n), at 409 and 410.

Then, at Frame(n+1), the gNB 101 may be configured to provide the correction TOA T0(n) to the UE 102 at 416, for example, encoded in a data packet. The UE 102 may receive the TOA T0(n) decoded from the data packet at 417. Further, the UE 102 may already have the TOA T1(n) corrections. Hence, a precise $T_{prop}$ measurement as specified in equation 3 or equation 4 may be performed by the UE 102 at 419 and 420. At 421, the UE 102 may be configured to determine a distance between the gNB 101 and the UE 102 based on the propagation delay.

In an embodiment, it may be assumed that the reception of a TOA T0 correction may also trigger a TOA propagation delay measurement, and thus the operations at Frame(n-1) may be considered as a trigger or a precondition.

Hence, the proposed modification in the TOA concept for a distributed RAN/cloud system architecture may have an impact on the $T_{prop}$ calculation by the UE 102 in a way that the same reference signal may be used for the measurements. The effect may be illustrated as additional steps 416-418 in $T_{prop}$ calculation shown in FIG. 4 as compared to FIG. 3 illustrating the concept for the centralized RAN.

If the time marker provided in SIB9, or in general the reported network time, already includes the base station delay compensation, Tb(n, Tair(Ta, n)) and Ta (n) may refer to the same time Ra. In fact, $T_0(n)Dist$ may be used for gNB-based propagation delay pre-compensation.

Hence, by using the equation 2, it may be possible to properly calculate a TOA T0 correction for a distributed RAN/cloud system architecture with Tair/Ra as a reference. Then, by using the equation 3 or equation 4 and the procedure of FIG. 4, it may be possible to precisely determine Tprop using the same reference signal. A possible discrepancy of reference clocks at DU and RU may be also compensated. Hence, the TOA concept may be adapted to a variable delay environment, which is typical for distributed RAN and cloud system architectures.

In case the measured TOA T0 corrections are variable in consecutive measurements, the UE 102 may be configured to use for the TOA based propagation delay measurement procedure the same reference signal, e.g., Frame(n). TOA T0 may be provided in a cell broadcast, e.g., as part of SIB9 data, and thus the UE 102 may be configured to monitor the quality of TOA T0 reports from the given base station.

For example, if the reported TOA T0 values have an irregular or random distribution, or even poor accuracy, the UE 102 may be configured to use the procedure as proposed in on FIG. 4 and equation 3 or equation 4. By using the same reference signal, the instability of consecutive TOA T0 measurements may have no impact on the propagation delay measurements as both TOA T0 and TOA T1 may be calculated for the same reference signal. Typically, this option may be applicable to a distributed RAN/cloud system architecture due to possible unpredictable delay factors, such as the factor $\Delta(Ta;Tb)$.

In general, usage of the same reference signal, e.g., Frame (n), for propagation delay measurements may improve the accuracy of propagation delay measurements. This may have an impact on UE positioning or UE RRC connection establishment supported by TOA. Thus, even in a centralized RAN system architecture, the procedure illustrated by FIG. 4 may be used. Thus, a usage of the algorithm from FIG. 3 or FIG. 4 may be considered as a tradeoff between an expected propagation delay measurement accuracy and measurement time.

Figure 5:
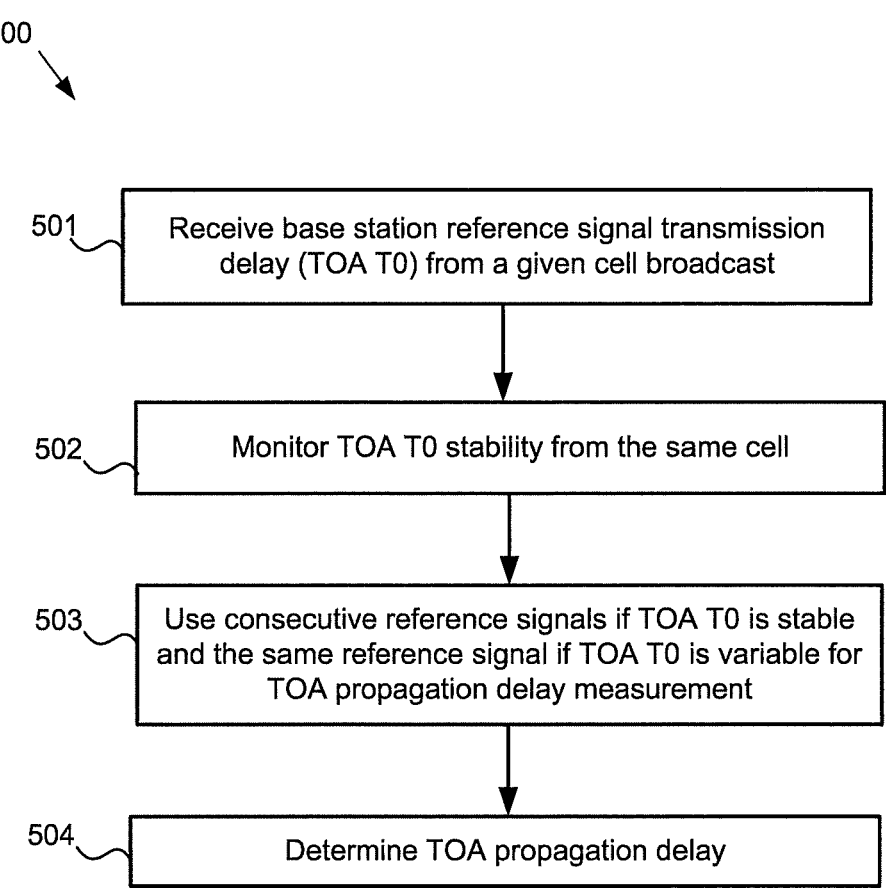
FIG. 5 illustrates a flow chart of a method for TOA propagation delay measurement based on base station reference signal transmission delay stability criteria, according to an example embodiment.

FIG. 5 illustrates a block diagram of a method 500 for TOA propagation delay measurement based on base station reference signal transmission delay stability criteria, according to an example embodiment.

As explained above, typically in centralized RAN system architectures, consecutive TOA T0 values may have similar values, whereas in a distributed RAN/cloud system architecture, Ra may be used as a reference and Δ(Ta;Tb) may cause TOA T0 variability.

At 501, a UE may be configured to receive cell broadcast during standard cell search, cell selection, or cell re-selection procedures, for example. The UE may be configured to decode the received cell broadcast and determine whether it supports and contains a TOA T0 correction. The TOA T0 correction may be considered as a trigger for TOA-based applications, such as positioning, RRC connection establishment, filtering, time synchronization, network time monitoring, support for extended connection or improving timing advance TA accuracy, for example.

At 502, the UE may be configured to optionally monitor TOA T0 performance. The TOA method may be applied both in an RRC Idle/Inactive or RRC Active state. In case no active connection may be required, the UE may use the TOA method for an offline purpose, which may give time for monitoring of a TOA T0 accuracy distribution. The operation 502 may be omitted if the UE's fast reaction, i.e., provision of positioning data, is required.

At 503, the UE may be configured to select one of possible options for TOA-based propagation delay measurement, e.g., based on an algorithm for stabile TOA T0 values, FIG. 3, or for variable TOA T0 or when a higher precision of the measurements may be required, as proposed in FIG. 4.

It should be noted that in general the UE may not be aware of whether it is served by a centralized or a distributed RAN/cloud system architecture. Thus, in the context of the proposed method, the UE may be also not aware of the way how the base station calculates TOA T0, equation 2. However, the UE may be able to assess the TOA T0 quality and stability by comparing consecutive TOA T0 values received from the same cell.

At 504, the UE may be configured to determine a TOA-based propagation delay and use Tprop for related applications. The accuracy of the propagation delay may depend on the algorithm used at 503.

In summary, in case of UE, the UE may improve the propagation delay accuracy by applying the algorithm illustrated in FIG. 4, in which the same reference signal may be used for TOA T0 and TOA T1 corrections assessments, which may improve the TOA-based propagation delay measurement accuracy.

The UE may be also configured to monitor the TOA T0 quality using the procedure as illustrated by FIG. 5 and the operation 502. Thus, the UE may improve the accuracy of Tprop, if higher precision is needed, or speed up the procedure, if time may be critical. Additionally, by observation of a TOA T0 distribution, the UE may be configured to decide whether to apply the algorithm shown in FIG. 3, if TOA T0 may have a stabile or predictable character, or to apply the algorithm shown in FIG. 4, if TOA T0 may have a variable character.

Further features of the methods directly result from the functionalities and parameters of the apparatuses, as described in the appended claims and throughout the specification and are therefore not repeated here. It is noted that one or more operations of the method may be performed in a different order.

Figure 6:
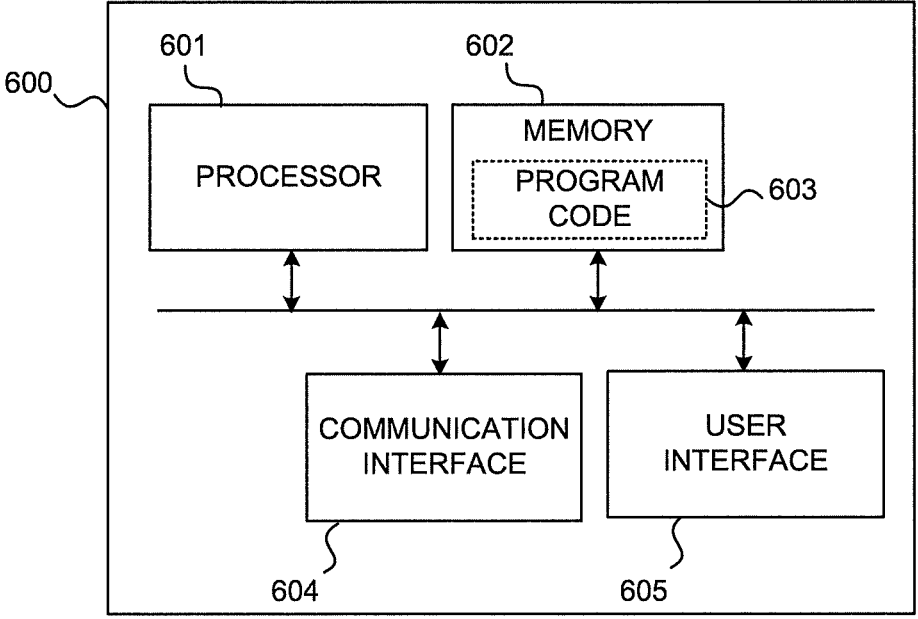
FIG. 6 illustrates an example of an apparatus configured to practice one or more example embodiments.

FIG. 6 illustrates an example of an apparatus configured to practice one or more example embodiments. The apparatus 600 may comprise at least one processor 601. The at least one processor 601 may comprise, for example, one or more of various processing devices, such as for example a co-processor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The apparatus 600 may further comprise at least one memory 602. The memory 602 may be configured to store, for example, computer program code 603 or the like, for example operating system software and application software. The memory 602 may comprise one or more volatile memory devices, one or more non-volatile memory devices, and/or a combination thereof. For example, the memory 602 may be embodied as magnetic storage devices (such as hard disk drives, magnetic tapes, etc.), optical magnetic storage devices, or semiconductor memories (such as mask ROM, PROM (programmable ROM), EPROM (erasable PROM), flash ROM, RAM (random access memory), etc.).

The apparatus 600 may further comprise one or more communication interfaces 604 configured to enable the apparatus 600 to transmit and/or receive information to/from other apparatuses. The communication interface may be configured to provide at least one wireless radio connection, such as for example a 3GPP mobile broadband connection (e.g. 3G, 4G, 5G). However, the communication interface 604 may be configured to provide one or more other types of connections, for example a wireless local area network (WLAN) connection such as for example standardized by IEEE 802.11 series or Wi-Fi alliance; a short range wireless network connection such as for example a Bluetooth, NFC (near-field communication), or RFID connection; a wired connection such as for example a local area network (LAN) connection, a universal serial bus (USB) connection or an optical network connection, or the like; or a wired Internet connection. The communication interface 604 may comprise, or be configured to be coupled to, at least one antenna to transmit and/or receive radio frequency signals. One or more of the various types of connections may be also implemented as separate communication interfaces, which may be coupled or configured to be coupled to a plurality of antennas.

The apparatus 600 may further comprise a user interface 605 comprising an input device and/or an output device. The input device may take various forms such as a keyboard, a touch screen, or one or more embedded control buttons. The output device may for example comprise a display, a speaker, a vibration motor, or the like.

When the apparatus 600 is configured to implement some functionality, some component and/or components of the apparatus 600, such as for example the at least one processor 601 and/or the memory 602, may be configured to implement this functionality. Furthermore, when the at least one processor 601 is configured to implement some functionality, this functionality may be implemented using program code 603 comprised, for example, in the memory 602.

The functionality described herein may be performed, at least in part, by one or more computer program product components such as software components. According to an embodiment, the apparatus 600 comprises a processor or processor circuitry, such as for example a microcontroller, configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), application-specific Integrated Circuits (ASICs), application-specific Standard Products (ASSPs), System-on-a-chip systems (SOCs), Complex Programmable Logic Devices (CPLDs), Graphics Processing Units (GPUs).

The apparatus 600 comprises means for performing at least one method described herein. In one example, the means comprises the at least one processor 601, the at least one memory 602 including program code 603 configured to, when executed by the at least one processor 601, cause the apparatus 600 to perform the method.

The apparatus 600 may comprise for example a computing device such as for example a base station, a network node, a server device, a client node, a mobile phone, a tablet computer, a laptop, or the like. Although the apparatus 600 is illustrated as a single device it is appreciated that, wherever applicable, functions of the apparatus 600 may be distributed to a plurality of devices. Functions of the devices may be operable, for example, in the cloud.

Any range or device value given herein may be extended or altered without losing the effect sought. Also, any embodiment may be combined with another embodiment unless explicitly disallowed.

The apparatus may be configured to perform or cause performance of any aspect of the method(s) described herein. Further, a computer program may comprise instructions for causing, when executed, an apparatus to perform any aspect of the method(s) described herein. Further, an apparatus may comprise means for performing any aspect of the method(s) described herein. According to an example embodiment, the means comprises at least one processor, and memory including program code, the at least one memory and the program code configured to, when executed by the at least one processor, cause performance of any aspect of the method(s).

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The operations of the methods described herein may be carried out in any suitable order, or simultaneously where appropriate. Additionally, individual blocks may be deleted from any of the methods without departing from the scope of the subject matter described herein. Aspects of any of the embodiments described above may be combined with aspects of any of the other embodiments described to form further embodiments without losing the effect sought.

The term 'comprising' is used herein to mean including the method, blocks, or elements identified, but that such blocks or elements do not comprise an exclusive list and a method or apparatus may contain additional blocks or elements.

As used in this application, the term 'circuitry' may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims.

As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from scope of this specification.

What is claimed is:

1. An apparatus, comprising:
at least one processor; and
at least one;
non-transitory memory storing instructions that, when executed with the at least one processor, cause the apparatus at least to:
while in a radio-resource-control (RRC) Idle or Inactive state, receive, from a base station operating in a distributed radio access network (RAN) architecture in which a distributed unit (DU) communicates with a radio unit (RU) over an enhanced common public radio interface (eCPRI), a time-of-arrival (TOA) reference signal transmission delay correction via cell broadcast including absolute network time (SIB9), wherein the correction (i) corresponds to a last received packet associated with a synchronization signal block (SSB) in a first slot of a first frame, (ii) is computed at the base station using over-the-air transmission time (Ra) as a reference with an explicit compensation term accounting for a discrepancy between a DU reference clock (Ta) used for Packet Data Convergence Protocol in Layer-2 (PDCP/L2) timestamping and a Radi Unit (RU) reference clock (Tb) used to execute the Ra, and (iii) includes an antenna external-delay component measured at the base-station antenna reference point;

in response to receiving the TOA reference signal transmission delay correction, determine, for a same SSB in the first frame, a reference signal reception delay TOA;

determine a time of arrival propagation delay for the SSB by subtracting the received TOA reference signal transmission delay correction from the determined reference signal reception delay TOA; and utilizing the determined time of arrival propagation delay to compute a distance to the base station based on electromagnetic speed.

2. The apparatus of claim 1, wherein the instructions, when executed with the at least one processor, cause the apparatus to:

monitor stability of the reference signal transmission delay corrections with comparing consecutive reference signal transmission delay values received from the same cell with the user node; and determine the time of arrival propagation delay based on consecutive reference signals with subtracting the reference signal transmission delay correction of a previous reference signal from the reference signal reception delay of the last received reference signal when the reference signal transmission delay values are stabile and with using the same reference signals when the network node reference signal transmission delay values are variable.

3. The apparatus of claim 1, wherein the at least one application comprises at least one of positioning, radio resource control, connection establishment, filtering, time synchronization, network time monitoring, support for extended connection, or improving time advance accuracy.

* * * * *